United States Patent

[11] 3,631,757

| [72] | Inventor | Leslie Parkin |
| | | Bobbers Mill, England |
| [21] | Appl. No. | 862,852 |
| [22] | Filed | Oct. 1, 1969 |
| [45] | Patented | Jan. 4, 1972 |
| [73] | Assignee | TRW Inc. |
| | | Cleveland, Ohio |
| [32] | Priority | Oct. 3, 1968 |
| [33] | | Great Britain |
| [31] | | 47,005/68 |

[54] NUT GUARD DEVICE
1 Claim, 4 Drawing Figs.

[52] U.S. Cl. .................................................. 85/36,
85/56, 151/16
[51] Int. Cl. .................................................. F16b 37/02
[50] Field of Search .......................................... 85/36, 32
V, 56, 55, 53, 32, DIG. 3; 151/16, 15; 40/202, 203

[56] References Cited
UNITED STATES PATENTS

| 2,082,311 | 6/1937 | Blankensteyn | 85/DIG. 3 |
| 2,149,719 | 3/1939 | Arnest | 85/36 |
| 2,197,220 | 4/1940 | Kost | 85/36 |
| 2,284,081 | 5/1942 | Beggs | 85/32 V |
| 3,241,427 | 3/1966 | Bosler | 85/56 |
| 3,394,747 | 7/1968 | Duffy | 85/36 |

*Primary Examiner*—Edward C. Allen
*Attorneys*—Philip E. Parker, Gordon Needleman, James R. O'Connor, John Todd and Hall and Houghton ABSTRACT: A guard for a nut assembly with a threaded bolt comprises a cup-shaped member which forms a shroud for the nut and is secured in assembly by the shank of the bolt being gripped by resilient tongues extending from the edge of an opening in the base of the cup.

PATENTED JAN 4 1972 3,631,757

INVENTOR
LESLIE PARKIN
BY
James R O'Connor
ATTORNEY

NUT GUARD DEVICE

This invention relates to a device adapted to form a guard for a nut to prevent it being unscrewed from a screw-threaded bolt.

The present invention provides a nut guard comprising a cup-shaped housing formed of metal, the base of the cup having an opening formed with a plurality of resilient tongues extending inwardly of the opening form the peripheral edge thereof, the width and length of the housing measured internally, being greater than the maximum width and thickness of the nut to be guarded so that when positioned over a nut and bolt assembly, the housing forms a shroud for the nut and is secured in assembly by the tongues engaging the threads on the end of the shank of the bolt which projects beyond the nut.

The invention also includes a nut and bolt assembly comprising a bolt extending through an aperture in a member and a nut screwed on to the bolt so as to abut the adjacent face of the said member, a nut guard shrouding the nut and comprising a cup-shaped housing formed of metal, the base of the cup having an opening formed with a plurality of resilient tongues extending inwardly of its peripheral edge, the end wall of the housing remote from the base being in abutment with the said adjacent surface of the said member so that the nut is shrouded by the housing, a portion of the shank of the bolt extending through the said aperture in the base of the cup and being gripped by the resilient tongues.

The nut guard is assembled by entering the free end of the bolt of a nut and bolt assembly into the opening in the base of the housing and applying pressure axially of the bolt to force the housing along the bolt until it shrouds the nut. The tongues will be sufficiently resilient to flex and ride over the threads of the bolt during this axial movement. The tongues preferably extend at an angle to the axis of the housing and have a pitch which is the reverse to the pitch of the threads on the bolt such that any attempt to rotate the housing will cause the free ends of the tongues to either rotate freely on the bolt without axial movement or bite more firmly into the bolt and thereby increase the locking action.

The nut guard is particularly useful in preventing the unauthorized removal of nuts used to secure an article to a support, for example, a fog or spot lamp mounted on the bumper of a motor vehicle. Such articles are secured by a nut which is exposed and therefore can easily be removed by a thief.

To enable the invention to be fully understood, it will now be described, by way of example, with reference to the accompanying drawings in which.

Figure 1:
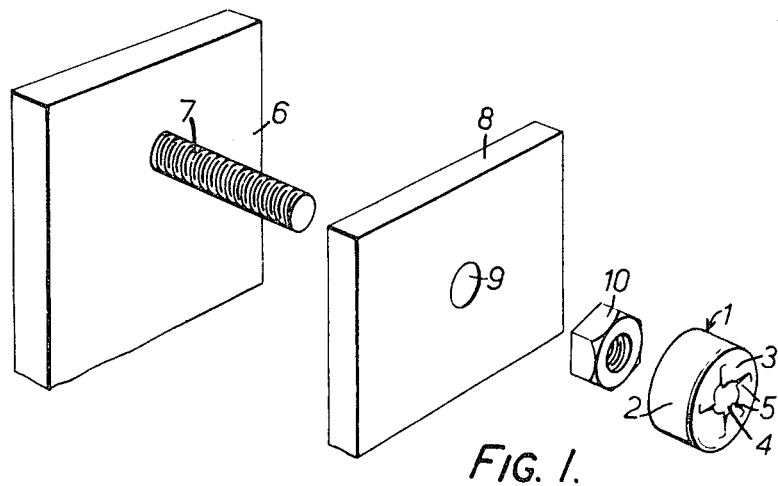
FIG. 1 is an exploded view of an assembly including a threaded bolt, a nut and a nut guard.
Figure 2:
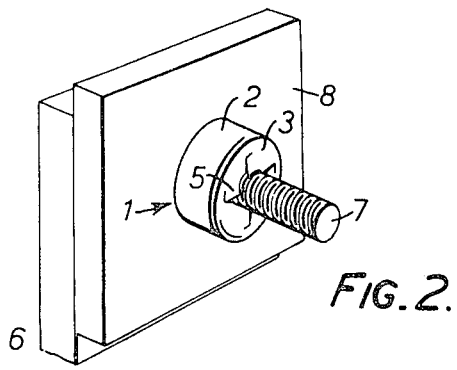
FIG. 2 is a fragmentary perspective view illustrating the assembly of the parts illustrated in FIG. 1.
Figure 3:
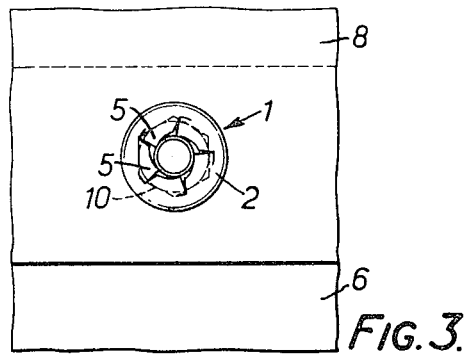
FIG. 3 is a front elevation of the assembly.
Figure 4:
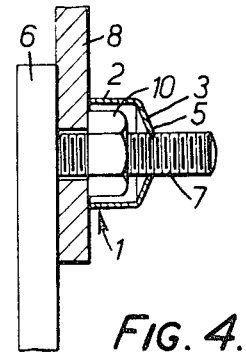
FIG. 4 is a side view of the assembly, parts being shown in section.

As shown in the drawings, the nut guard comprises a cup 1 formed of hard metal defining a housing having a cylindrical wall 2 and a base 3. The base is formed with a bolt-receiving opening 4 and the peripheral edge of the opening is formed with a plurality of resilient tongues 5 extending at an angle to the axis of the bolt.

6 indicates a support, for example, the bumper of a motor vehicle having a threaded bolt 7 projecting therefrom and 8 indicates an article to be secured to the support and which is formed with a bolt-receiving aperture 9. 10 indicates a nut adapted to be screwed on to the bolt 7 to secure the article 8 to the support.

The article 8 is assembled with the support by inserting the bolt 7 through the aperture 9 and screwing the nut 10 on the bolt by clamp the article against the support 6.

The nut guard is then presented to the free end of the bolt so that it is aligned with the opening 4 and pressure is applied to the nut guard to force it axially along the bolt until it abuts the article 8 in which position the cup of the nut guard completely shrouds the nut so that it is impossible for any one to obtain access to the nut to unscrew it.

The angle at which the tongues 5 extend with relation to the threads on the bolt is such that if the cup is rotated in an anticlockwise direction as viewed in the drawings, the nut guard will rotate about the bolt but will not move axially. If the nut guard is rotated in a clockwise direction, the tongues will be forced to bite into the bolt. Accordingly, rotation of the nut guard in either direction will not effect the removal of the nut guard. The wall 2 of the nut guard is deliberately made cylindrical to make it more difficult for it to be gripped by a conventional spanner.

I claim:

1. An assembly comprising an apertured member, a bolt having a screw-threaded shank extending through the aperture in said member, a nut screwed on to said shank so as to abut an adjacent face of said member, and a nut guard shrouding the nut and comprising a cup-shaped housing formed of resilient, sheet metal and having a base spaced from the said member and disposed substantially parallel to said member and having a plurality of resilient tongues struck therefrom and defining an aperture therein, the said tongues extending at an angle to the longitudinal axis of the housing and having free ends disposed at points along a defined helix, the pitch of the defined helix being reversed to the pitch of the thread on the bolt, and said housing having a cylindrical barrel extending generally perpendicularly from said base, said cylindrical barrel having an end wall remote from the base disposed in abutment with the said adjacent surface of the said member so that the nut is shrouded by the housing, the internal diameter of said cylindrical barrel being less than one and one-half times the maximum external width of the nut whereby the internal wall of said barrel lies closely proximate and substantially parallel to the external sides of the nut, a portion of the shank of the bolt extending through the said aperture in the base of the cup and being gripped by the said resilient tongues.

* * * * *